United States Patent

[11] 3,611,321

[72] Inventors Ralph H. Baer
Manchester, N.H.;
Thomas L. McCormack, Chelmsford, Mass.

[21] Appl. No. 819,070
[22] Filed Apr. 24, 1969
[45] Patented Oct. 5, 1971
[73] Assignee Sanders Associates, Inc.
Nashua, N.H.

[54] MEMORY DEVICE AND METHOD AND CIRCUITS RELATING THERETO
6 Claims, 17 Drawing Figs.

[52] U.S. Cl. .......... 340/173 SP
[51] Int. Cl. .......... G11c 11/24, G11c 5/04, G11c 17/00
[50] Field of Search .......... 340/173, 174

[56] References Cited

UNITED STATES PATENTS

| | | | |
|---|---|---|---|
| 3,011,156 | 11/1961 | MacPherson | 340/173 |
| 3,411,148 | 11/1968 | Fetterolf et al. | 340/173 |
| 3,484,766 | 12/1969 | Constantinides et al. | 340/174 |
| 3,077,591 | 2/1963 | Aknenkalns et al. | 340/173 X |
| 3,118,133 | 1/1964 | Meeker et al. | 340/173 |
| 3,183,485 | 5/1965 | Cubbage | 340/173 X |
| 3,506,969 | 4/1970 | Abbas | 340/173 |

*Primary Examiner*—Stanley M. Urynowicz, Jr.
*Attorney*—Louis Etlinger

ABSTRACT: The signal-to-noise ratio of a read-only memory of the capacitive type is improved greatly by a three-dimensional structure in which capacitive coupling is achieved by members which project toward each other in a third dimension perpendicular to the planes defined by the input and the output lines. Method steps for the manufacture of a three-dimensional structure of this kind involve the use of printed circuit techniques to build up successive circuit levels which are molecularly united to form the necessary electrical connections, these levels providing the required three-dimensional relationship. The resulting capacitive memory plane is exceptionally rugged and reliable, as well as achieving a vast improvement in signal-to-noise ratio over prior art devices.

In addition, various circuit approaches are disclosed to increase the effective signal-to-noise ratio even further. In one such circuit the input lines are grouped in complemental pairs, and the input signal is always of the same polarity but is applied to a different one of a pair of complemental input lines, depending upon whether the bit is one or zero. An additional cancellation input line coupled to all the output lines is strobed with an input of opposite polarity so as to cancel noise. In another circuit the polarity of the input depends upon the binary value of a bit, and the output lines are arranged in complemental pairs, each pair coupled to a differential amplifier so as to double the signal-to-noise ratio. In still another circuit there is a common reference output line which supplies a noise reference voltage to each of several differential amplifiers connected to respective data output lines, with the result that noise voltages are cancelled. In a final circuit, the output lines are arranged in complemental pairs, each pair being connected to a differential amplifier. Then since the signal voltage exceeds the noise voltage, signal voltages can be discriminated from noise on the basis of the polarity of the net signal remaining after the smaller of these voltages is subtracted from the larger.

INVENTORS
RALPH H. BAER
THOMAS L. MC CORMACK
BY
ATTORNEY

INVENTORS
RALPH H. BAER
THOMAS L. MC CORMACK
BY [signature]
ATTORNEY

INVENTORS
RALPH H. BAER
THOMAS L. MC CORMACK
BY

ATTORNEY

INVENTORS
RALPH H. BAER
THOMAS L. MC CORMACK
BY [signature]
ATTORNEY

INVENTORS
RALPH H. BAER
THOMAS L. MC CORMACK
BY
ATTORNEY

INVENTORS
RALPH H. BAER
THOMAS L. MC CORMACK
BY
ATTORNEY

MEMORY DEVICE AND METHOD AND CIRCUITS RELATING THERETO

FIELD OF THE INVENTION

This invention relates generally to electronic data processing, and is particularly concerned with a fixed capacitive memory plane having a variety of data storage and translation applications.

THE PRIOR ART

The data processing art has many uses for read-only memories, i.e. devices that store a fixed data pattern which can be read out electronically at will, but which cannot be changed without substituting or reconstructing the memory. Some uses for memory planes of this type are for code translation, i.e. encoding and decoding, fixed program storage, fixed table storage, special function generation according to a fixed functional relationship, generation of predetermined alphanumeric characters, and any other operation in which an incoming data pattern is to be compared with a fixed stored data pattern.

Memories of this kind derive their operating characteristics from the fact that the fixed data pattern stored therein is built into the memory plane inherently at the time of manufacture. One memory plane of this type employs a grid of input and output lines arranged to form a matrix of crossover points. At some of these crossover points, means designed to produce a large capacitance between the two crossing lines are provided. If such a large capacitance is provided, then one binary value is stored at that matrix address, e.g. binary ONE. If no special high capacitance structure is provided at a particular crossover, then the opposite binary value, e.g. binary ZERO is stored at that matrix address. Examples of prior art capacitive memory planes of this type are seen in Akmenkalns U.S. Pat. No. 3,077,591 and Cubbage U.S. Pat. Nos. 3,183,485 and 3,183,490.

In these prior art patents, the distinction between a high capacitance crossover point and a vacant crossover point resides entirely in the fact that the high-capacitance crossover employs enlarged capacitor plates in the form of a metal film deposited on the surface of a dielectric material which forms the substrate of a memory plane, whereas there are no such enlarged capacitor plates at vacant crossover points. The capacitor plates produce a substantially higher capacitance at their crossover points, compared to the vacant sites where there are no plates.

But even at vacant sites there is a stray capacitance between the crossing lines of the grid, even though it is not as large as the capacitance between the enlarged plates. This stray capacitance unavoidably couples some of the input voltage to the output lines, thus allowing a noise voltage to appear at the output of the memory plane. In prior art fixed capacitive storage devices of this kind, this problem has contributed to an unsatisfactory signal-to-noise ratio.

SUMMARY AND OBJECTS OF THE INVENTION

A principal object of this invention is to provide a fixed capacitive memory plane with a greatly improved signal-to-noise ratio. This is accomplished by improvements in the structure of the memory plane itself. The capacitive plates are at the extreme of an extension from the input and output conductors so that they project down into the dielectric substrate material and reach toward each other to effect a great increase in the desired capacitance. By this technique, an improved ratio of capacitance at grid locations with plates as compared to grid locations without plates results, and in addition, the parallel line capacitance is reduced. From a manufacturing point of view, method aspects of the invention are concerned with building up such a three-dimensional structure layer by layer, using printed circuit techniques.

The broad concept of extending the capacitor plates toward each other in the depth direction was previously suggested by MacPherson U.S. Pat. No. 3,011,156. There are, however, a number of difficulties with the MacPherson memory plane structure. For one thing, the MacPherson device is not as solidly or ruggedly constructed as might be desired for certain applications, in that it has vacant spaces within the body of the memory plane. In addition, the electrical connections made to the capacitor plates by the $x$ and $y$ conductors of the MacPherson matrix are mechanical in nature, i.e. they depend upon the relative pressure between two separate bodies, a capacitor plate and lead which extends into contact therewith. It would be preferable to provide a capacitive memory plane which comprises a single solid structure of rugged construction having no internal vacant spaces whatever, and in which all electrical connections between the input and output conductors and the capacitor plates are made by molecular bonding, so as to avoid dependence upon variable mechanical pressures.

Accordingly, and additional important object of the invention is to provide a fixed capacitive memory plane which combines a high signal-to-noise ratio with mechanical solidity and ruggedness and electrical reliability.

An additional problem with the MacPherson structure is that it provides a pair of capacitor plates at each and every crossover point of the input and output conductors, thus increasing the stray capacitance at those crossover points where coupling is not desired. An additional objective of this invention therefore is to provide a fixed capacitive memory plane in which the capacitance ratio between high-capacitance and stray capacitance crossovers is enhanced by providing a pair of capacitor plates at each high-capacitance point, and eliminating such capacitor plates entirely from locations where it is desired to minimize the capacitance.

Another object of this invention is to provide a fixed capacitive memory plane in which the capacitance between parallel lines is reduced by providing capacitive plates at the extreme of an extension from the input and output conductors.

Finally, the signal-to-noise ratio is further enhanced in accordance with this invention by employing a fixed capacitive memory plane in various novel circuit arrangements which operate to cancel out or otherwise discriminate against the noise voltage output resulting from whatever level of noise capacitance unavoidably remains in the memory plane structure.

BRIEF DESCRIPTION OF THE DRAWING

The same reference characters refer to the same elements throughout the several views of the drawing.

DETAILED DESCRIPTION OF THE PREFERRED EMBODIMENTS

Figures 1, 2, 3:
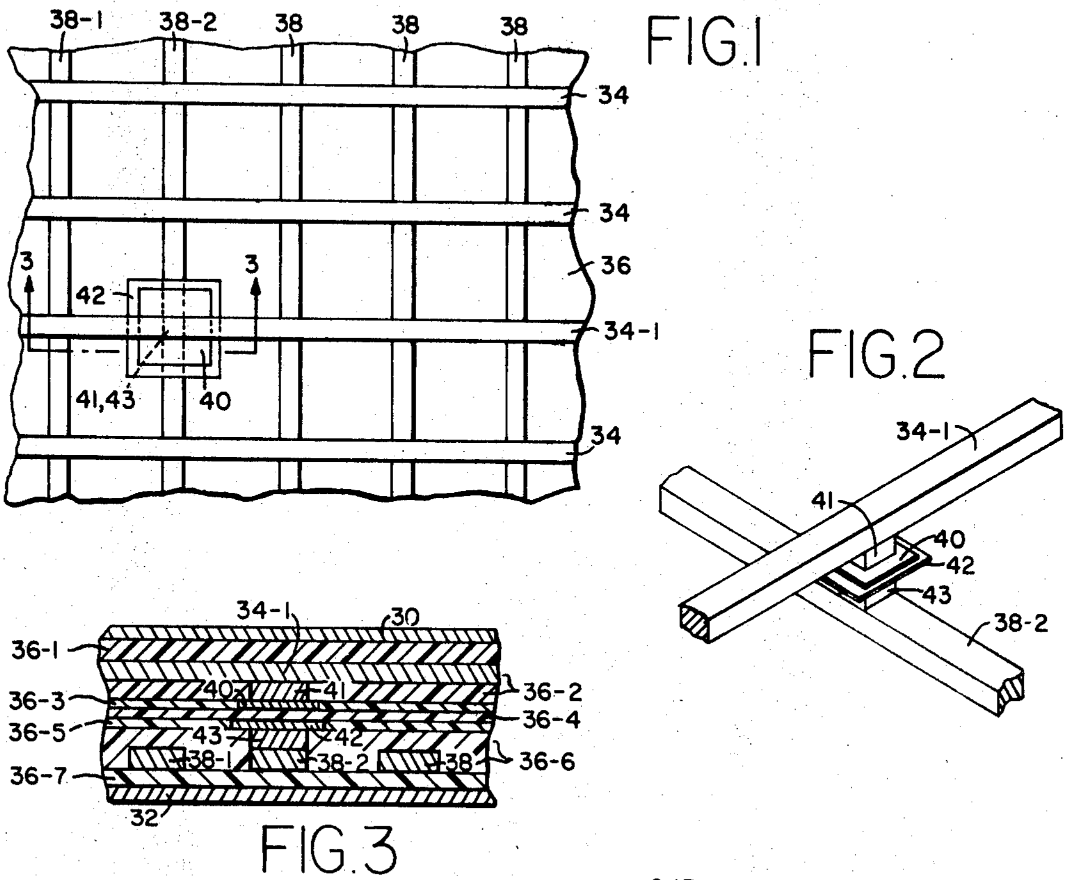
FIG. 1 is a fragmentary top plan view of a fixed capacitive read-only memory plane according to the present invention, with the top layers thereof removed for clarity of illustration.
FIG. 2 is a perspective view of a single high capacitance crossover point of the memory plane of FIG. 1, showing only the input and output conductors and their respective capacitor plates. The dielectric substrate material in which they are embedded has been removed for clarity of illustration.
FIG. 3 is a fragmentary sectional view taken along the lines 3—3 of FIG. 1, showing one high-capacitance and one low-capacitance crossover. In this view the top layers of the memory plane are illustrated.

FIG. 1 shows the memory plane of this invention as it would look if the top layers 30 and 36—1 (FIG. 3) were removed to expose a plurality of parallel *x*-direction conductors 34 formed by electrodeposition of thin copper film upon a dielectric substrate 36. The substrate may be made of a material such as epoxy filled with glass fibers. The *x*-direction conductors 34 are coplanar, i.e. they are all deposited at the same level upon the dielectric material 36.

Embedded within the dielectric material 36 are a plurality of parallel *y*-direction conductors 38 similarly formed of thin copper film. The set of conductors 38 is also coplanar, and occupies a plane within the body of the substrate material 36 parallel to, and spaced from, the plane of the *x*-direction conductors 34. The intervening space between the two sets of conductors is filled with an epoxy or other dielectric material 36.

The set of conductors 34 and the set of conductors 38 are oriented orthogonally to form a matrix, each point in the matrix being a crossover of one of the *x*-direction conductors 34 and one of the *y*-direction conductors 38. Therefore, each crossover point is an address of the matrix defined by the crossing of a particular *x* conductor 34 and a particular *y* conductor 38. Some of the matrix addresses are points of high-capacitance coupling between the conductor 34 and conductor 38 at that address, and other matrix addresses are simple crossovers with as little stray capacitance as possible, as required by the data pattern stored in the fixed memory plane.

In the view of FIG. 1, a pair of capacitor plates 40 and 42 is provided to increase the capacitance between the crossing conductors 34 and 38 at each matrix address which requires a high-capacitance coupling. In addition capacitor plate 42 is made slightly larger than capacitor plate 40 in order to insure upon fabrication that full registration of the capacitor plates exists. Such capacitor plates 40 and 42 are omitted from all the other crossovers in the matrix, which are required to have as little capacitance as possible. It should be noted at this point that capacitor plates 40 and 42 may be of any planar shape, i.e., square (as shown), round, rectangular, etc.

FIG. 2 illustrates the crossover between the conductor 34—1 and the conductor 38—2, and shows their respective capacitor plates 40 and 42 which provide high capacitance at that particular address. Capacitor plates 40 and 42 are at the extreme of an extension from conductors 34—1 and 38—2 respectively. The extensions are provided by pillars 41 and 43 respectively. By providing these extensions, capacitance is minimized between parallel lines. Also illustrated is the overlapping of capacitor plate 42 over capacitor plate 40 in order to insure upon fabrication full capacitor plate registration. These elements are shown there in perspective to illustrate their three-dimensional relationship, and the dielectric material 36 in which they are embedded is removed form FIG. 2 for clarity of illustration.

Thus, it is seen that the *x* conductor 34—1 proceeds in a first direction at a first level, and the *y* direction conductor 38—2 proceeds in a perpendicular direction at a lower level relative to the depth dimension of the memory plane. The capacitor plate 40 is associated with the *x* conductor 34—1, and is at the extreme of pillar 41 which projects vertically downward toward the capacitor plate 42. The latter capacitor plate is associated with the *y* conductor 38—2, and is at the extreme of pillar 43 which projects upward toward the capacitor plate 40. Thus, the paired capacitor plates 40 and 42 not only enhance the capacitive coupling between the conductors 34 and 38 at the desired crossover points by virtue of their enlarged area, as in prior art devices, but also by being projected toward each other by means of pillars 41 and 42 through the depth dimension of the memory plane so that the space between the two plates 40 and 42 is a great deal smaller than the spacing between the conductors 34—1 and 38—2. It is this smaller spacing between the two capacitor plates 40 and 42 which provides the large capacitance at a high-capacitance crossover point. Conversely, the much larger spacing between, and smaller area of, the conductors 34 and 38 provides the much smaller stray capacitance which exists at a crossover point where the plates 40 and 42 are entirely lacking. In addition, by use of pillars 41 and 43, which are significantly smaller in cross section than their respective capacitor plates, capacitance between adjacent lines is reduced, thereby reducing adjacent line crosstalk or in other words increasing the signal-to-noise ratio between adjacent lines.

It is important to note that the electrical connection between each plate and its associated conductor, for example between the plate 40 and the conductor 34—1, is made by means of molecular bonding between the plate, the pillar and the conductor, and is not left to the relatively unreliable process of mechanical pressure contact, which can allow the electrical resistance to vary. This is particularly true in a structure of the prior art type which has vacant spaces within the body of the memory plane, and is therefore subject to mechanical movement under stress. By "molecular bonding" is meant a continuous and integral structural relationship between the plate, pillar and the conductor such that the three are mechanically and electrically indistinguishable and all of one piece. Such a relationship, for example, results from the electrodeposition of a metal upon that same metal. What has just been said is true of the relationship between each of the capacitor plates 40 or 42, pillars 41 or 43, and its associated conductor 34 or 38, the particular high-capacitance crossover point illustrated in FIG. 2 being typical of all high-capacitance crossover points within the matrix.

FIG. 3 is a sectional view illustrating the detailed internal structure of the memory plane. The dielectric body 36 has a thin copper film 30 deposited on the upper surface thereof, spaced from conductors 34 by a layer 36—1 of dielectric material, and a similar thin copper film 32 deposited on the lower surface thereof, and spaced from conductors 38 by a layer 36—7 of dielectric material, to provide electrostatic isolation for the circuit elements embedded within the dielectric material 36. In use, the copper films 30 and 32 would normally be connected to ground potential, and serve to isolate the circuit elements of the capacitive memory plane from adjacent circuitry, even permitting memory planes of this type to be staked one above the other so as to form a multilayer memory plane bank.

The *y* direction conductors 38, of which conductors 38—1 and 38—2 are typical, are embedded (in a direction perpendicular to the plane of FIG. 3) within the epoxy material 36 at a level labeled 36—6. The *x*-direction conductors 34, of which 34—1 is typical, are oriented in a direction parallel to the plane of FIG. 3 and are embedded in the dielectric material 36 at a level labeled 36—2. Thus, at the left of FIG. 3 is seen a typical low capacitance crossover between an *x*-direction conductor 34—1 and a *y*-direction conductor 38—1. The undesired stray capacitance between these two conductors is low, as determined by their overlapping area, i.e. the product of their respective widths, by the relatively large spacing between them which is occupied by a substantial thickness (levels 36—3, 36—4 and 36—5) of dielectric material 36 which intervenes between the two conductors, and by the dielectric constant of the epoxy Fiberglass material 36.

In contrast, at the right of FIG. 3 is seen a typical high-capacitance crossover in which the capacitor plate 40, pillar 41 and conductor 34—1 are molecularly bonded together such that the capacitor plate 40 is at the extension of the conductor 34—1 and is located at the level 36—3 of the dielectric material, and capacitor plate 42, pillar 43 and conductor 38—2 are molecularly bonded together such that the capacitor plate 42 is at the extension of the conductor 38—2 and is located at the level 36—5 of the dielectric material. This leaves a relatively small spacing occupied by level 36—4 of the dielectric. As a result, the relatively closer spacing produces a much larger coupling capacitance between the conductor 34—1 and conductor 38—2.

It will be appreciated best from the illustration of FIG. 3 that the memory plane is a completely solid structure in which all the metal members 30, 32, 34, 38, 41, 40 and 42 are either deposited on the surfaces or embedded within the volume of the dielectric material 36. The result is a rugged, monolithic, completely solid-state structure which has no voids within its confines. This makes the memory plane of this invention highly resistant to all kinds of mechanical stress, and, together with the molecular bonding between conductors 34 and 38, pillars 41 and 43 and the associated capacitor plates 40 and 42, provides a structure featuring perfect electrical connections throughout, without any dependency upon mechanical movement in response to pressures to which the memory plane may be subjected during operation.

A monolithic, three-dimensionally structured, high signal-to-noise ratio capacitive memory plane of this type may be constructed by a sequence of printed circuit steps illustrated by the successive views of FIGS. 8 through 17. The detailed information as to photoresists, exposures, chemical baths, timing, etc. for carrying out these steps may be obtained from U.S. Pat. application Ser. No. 277,646 filed May 2, 1963 and entitled "PRINTED CIRCUITS AND METHODS FOR PRODUCING THE SAME," which is assigned to the assignee of the present application. Accordingly, the present application need only refer generally to the sequence of manufacturing steps as they particularly affect the present invention.

Figure 8:
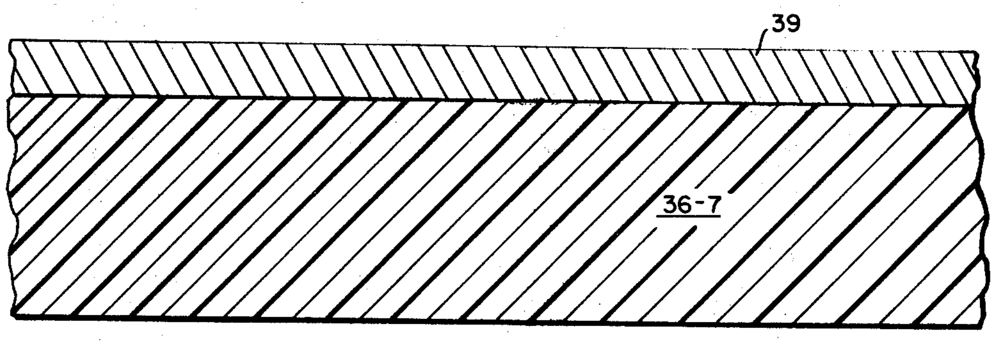
FIGS. 8 through 17 are a sequence of cross-sectional views showing the successive steps by which a three-dimensionally structured solid memory plane can be constructed by printed circuit techniques in accordance with this invention.
Figure 9:
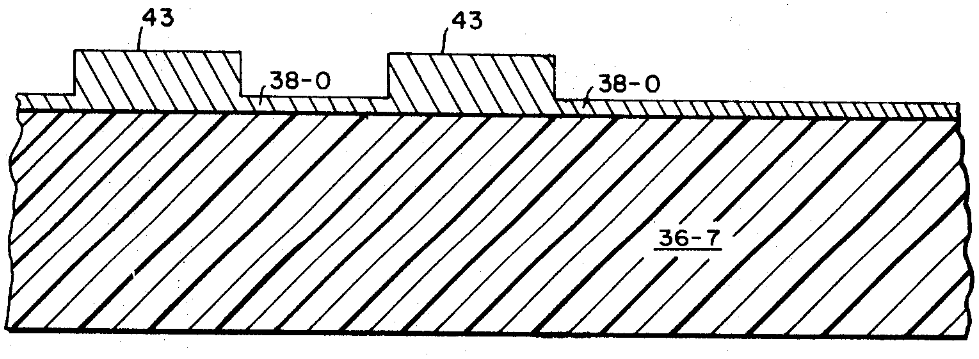
Figure 10:
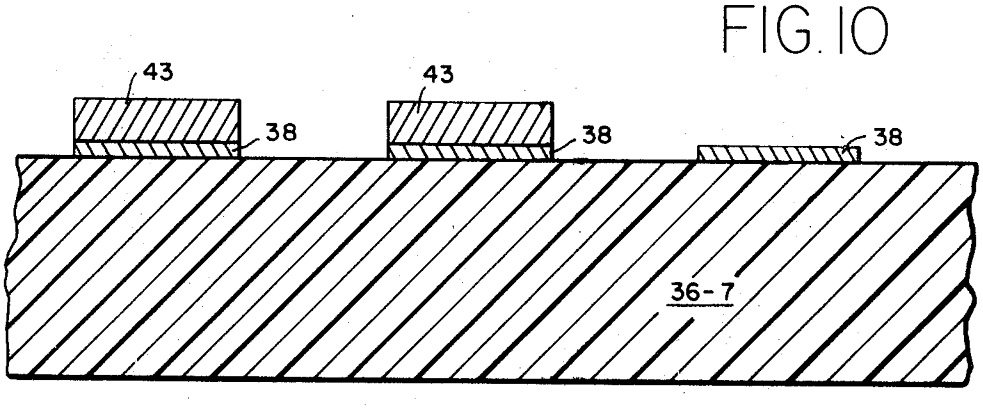

In FIG. 8, an epoxy fiber glass substrate board 36—7 is provided with a thin copper film 39 by means of an electrode position process. Subsequently, the copper film 39 is covered with a photoresist material and appropriately masked, exposed, and developed to a predetermined depth, so that portions of the film can be etched away, leaving only pillars 43 and a thin copper layer 38—0 on the surface of the substrate board 36—7, as seen in FIG. 9. This step leaves pillars 43 extending upward from copper layer 38—0 where a capacitor plate will be required or where a feed through for connection to drive or sense circuits will be required. For illustration purposes, out of three possible capacitor matrix locations shown, only two capacitor plates will be shown. The next step, illustrated in FIG. 10, is to remove the remaining photoresist material and recoat the copper layer 38—0 with photoresist material and appropriately mask, expose and develop so that portions of the copper layer 38—0 can be etched away, leaving only the conductor strips 38 as a series of parallel lands on the surface of substrate board 36— 7. Conductor strips 38 are shown perpendicular to the drawing.

Figure 11:
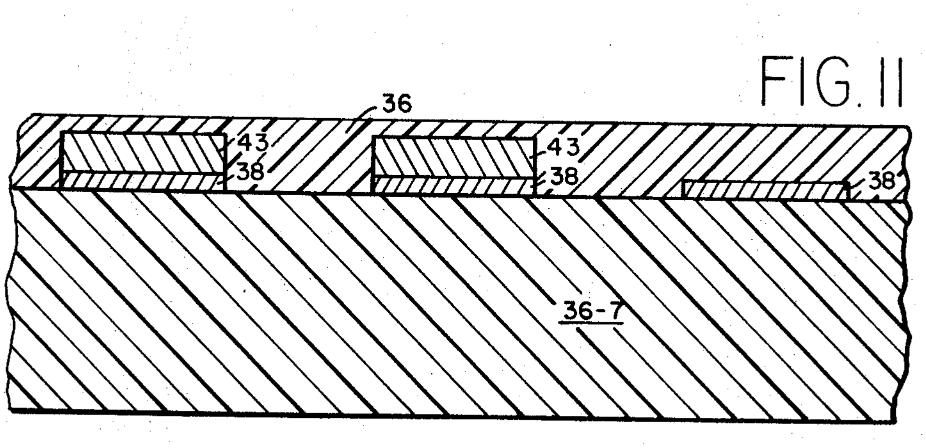
Figure 12:
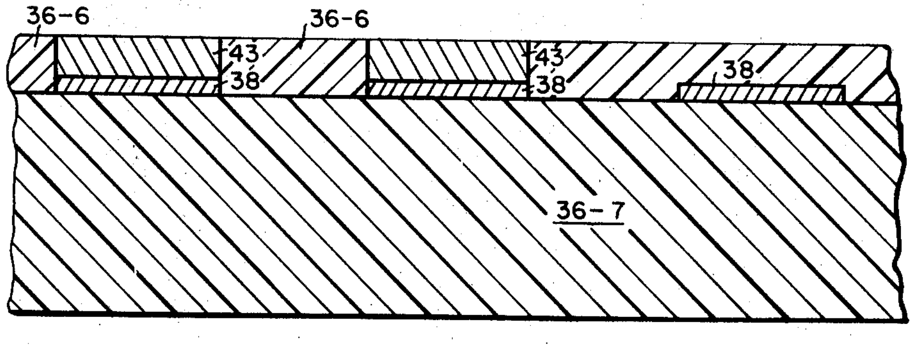

The next step, illustrated in FIG. 11, is to apply additional epoxy fiber glass material 36 over the substrate board 36—7, the pillars 43, and the copper lands 38. Then, in the next step, as illustrated in FIG. 12, the excess epoxy dielectric material is sanded away to leave a top layer 36—6 which is flush with the top surface of the pillars 43. This is the way in which the copper lands, i.e., the *y*-direction conductor strips 38, and the pillars 43, are embedded in the epoxy layer 36—6.

Figure 13:
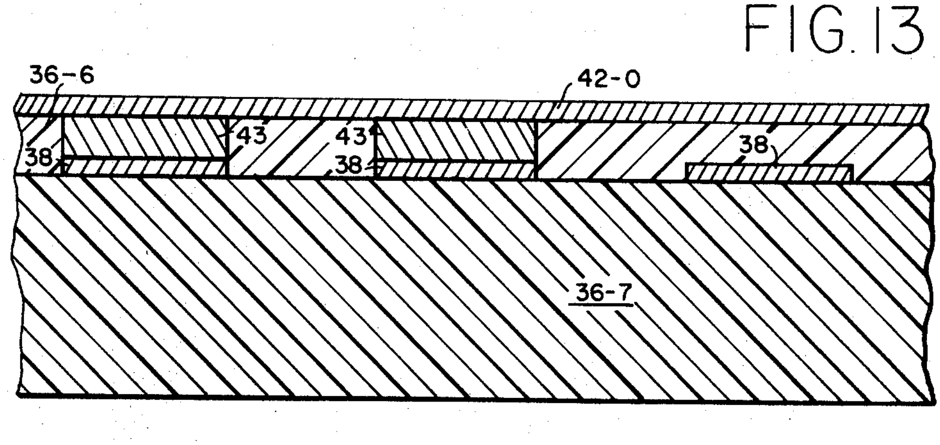

FIG. 13 illustrates the next step, in which another thin copper film 42—0 is electrodeposited over the flush surface of the epoxy layer 36—6 and pillars 43. This electrodeposition process provides for molecular bonding between the copper bodies 43 and 42—0, which is the basis for the molecular bonding between the pillars 43 and their respective capacitor plates 42 in the finished memory plane.

Figure 14:
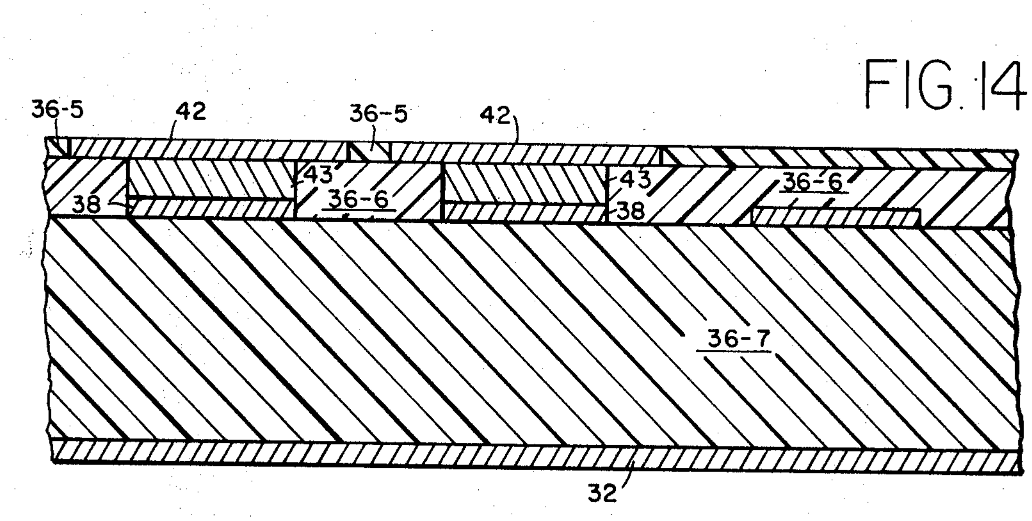

In FIG. 14, it is seen that the photoetching process is again used to remove the copper layer 42—0 except for the portion necessary to provide the capacitor plates 42 associated with respective *y* conductor strips 38 at the appropriate pillar locations. FIG. 14 also shows a ground plane 32 in the form of a thin copper film electro deposited on the bottom surface of substrate board 36—7.

The next step is to apply epoxy fiber glass material 36 over the epoxy material 36—6 and sand the excess epoxy material away until it is flush with the top surface of the capacitor plates 42. This leaves epoxy material 36—5 between and flush with capacitor plate 42 as illustrated in FIG. 14.

Figure 15:
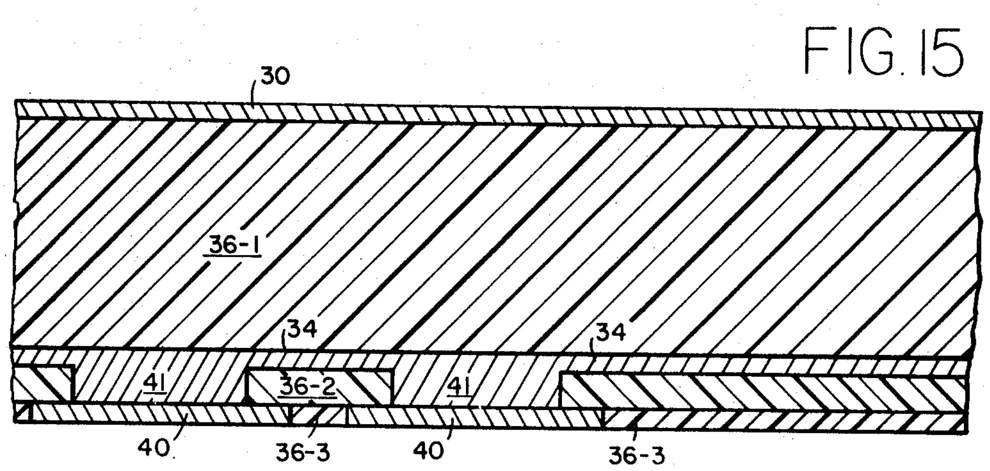

At this stage, one of the two sets of capacitor plates has been completed. A mating set of slightly smaller capacitor plates 42, where the plates 42 are connected to *x*-direction copper strips 34 by means of pillars 99 is fabricated in the same manner as directly stated above, and is illustrated in FIG. 15. It is the area of the smaller capacitor plate 40 which determines the capacitance at matrix points where plates are desired. Because of the overlapping of capacitor plate 42 over capacitor plate 40, complete registration between plate 40 and 42 is achieved resulting in a substantially equal capacitance for each of the desired capacitance matrix points.

Figure 16:
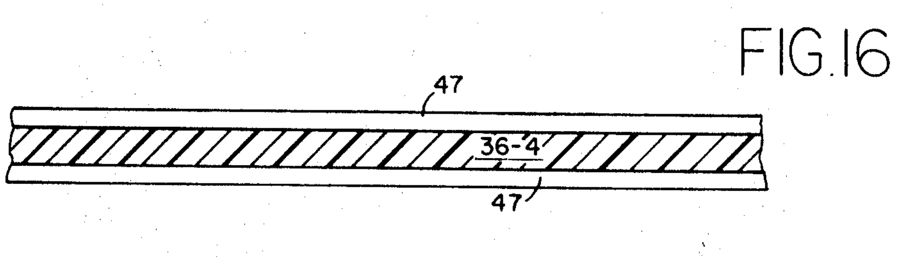
Figure 17:
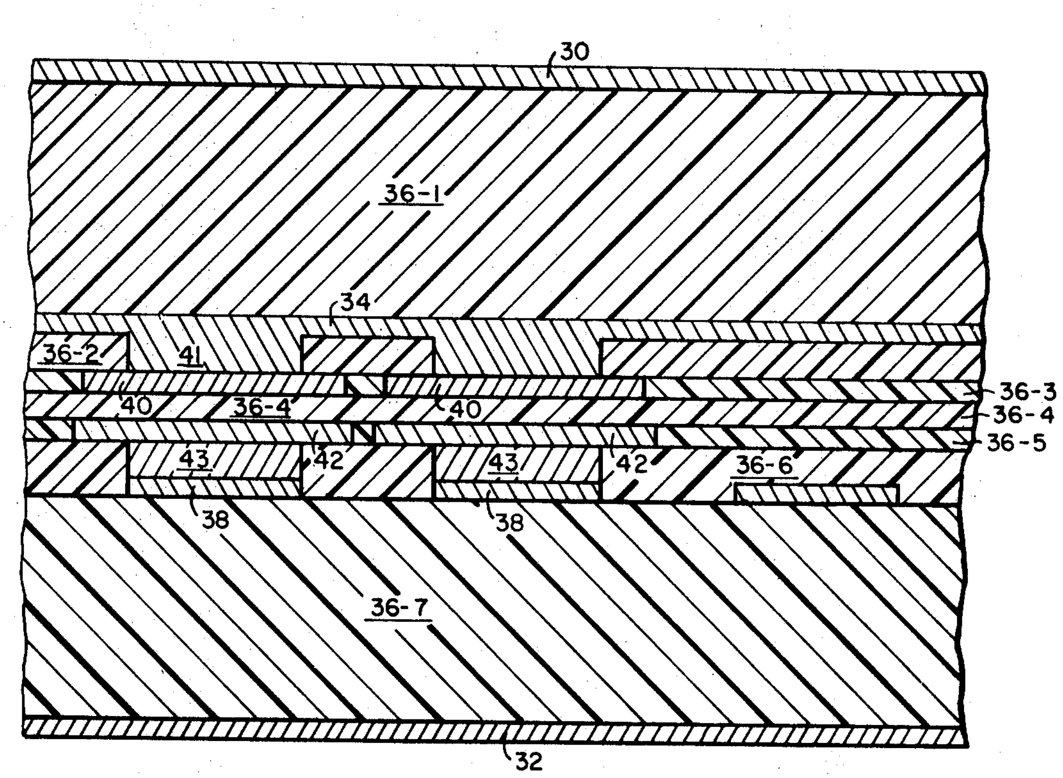

Once the two sets of capacitor plates have been fabricated, they are laminated together, using an indexing arrangement, via a dielectric 36—4 which has adhesive 47 coated on both surfaces as shown in FIG. 16. Dielectric 36—4 may be an epoxy fiber glass material. The resulting laminate, as shown in FIG. 17, is a solid molecularly united structure resembling a piece of double-sided copper printed circuit board.

It will now be fully appreciated that the described series of printed circuit steps produces a rugged, solid-state, monolithic memory plane structure which has no voids within its volume and in which all electrical connections between conductors, pillars and capacitor plates are effected through molecular bonding. In addition, the memory plane of this invention is convenient to manufacture, using well-established printed circuit procedures. The resulting product is relatively immune to mechanical stress by virtue of its molecularly bonded electrical connections and its monolithic structure, and exhibits a three-dimensional ordering of the capacitor plates which greatly increases the signal-to-noise ratio.

We now turn to a discussion of various circuits which illustrate applications for the memory plane of this invention, and also show specific techniques for further enhancing the signal-to-noise ratio of the memory plane in the given applications.

It will be appreciated that in any particular circuit one set of conductors 34 or 38 would be used as the input lines, and the other set of conductors used as the output lines of the memory matrix. Each address of the matrix would either have a high signal level of capacitive coupling or a low noise level of capacitive coupling according to the binary value of the bit stored at that memory address as required by the fixed data pattern which is built into the memory.

Figure 4:
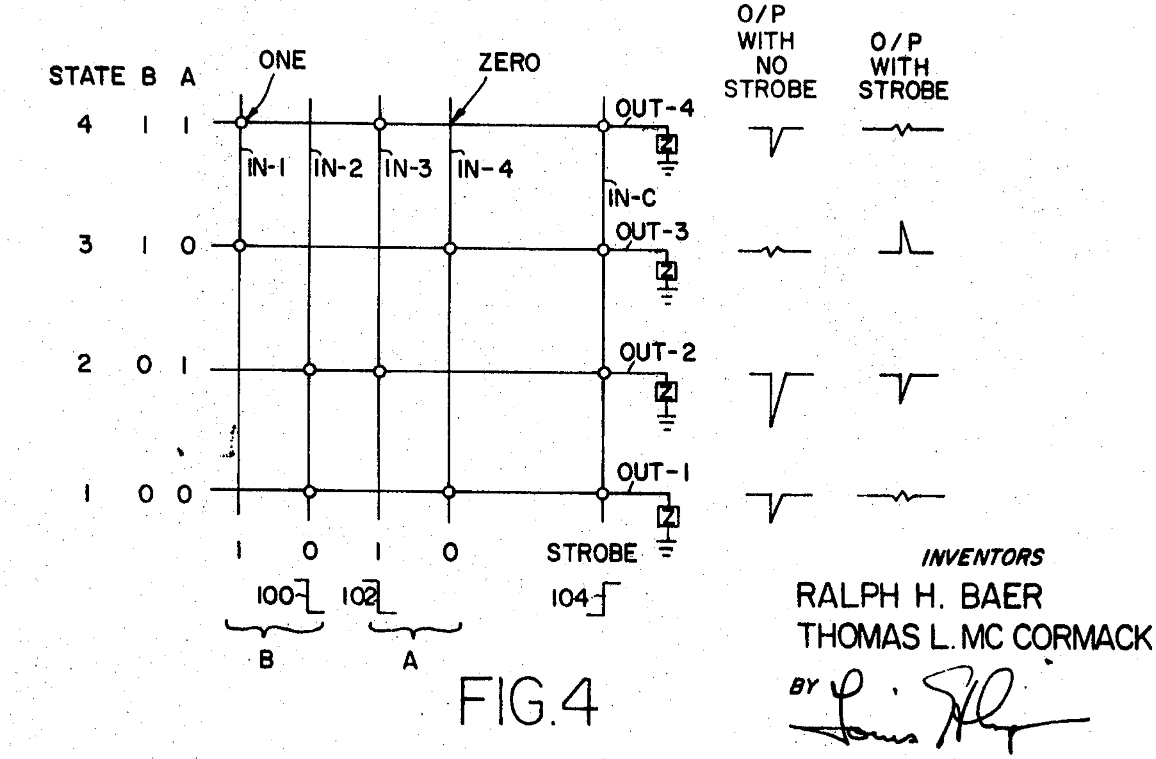
FIG. 4 is a schematic circuit diagram with corresponding voltage wave forms showing a circuit for enhancing the signal-to-noise ratio of a fixed capacitive memory plane.

The schematic diagram of FIG. 4 illustrates a circuit for decoding a bit parallel input of $n$=2 bits. The circuit comprises a memory matrix in which each high-capacitance crossover point is indicated by a circle, and each low-capacitance crossover point is indicated by the absence of such a circle. The arbitrary convention is adopted that a high-capacitance point indicates a binary ONE, while the absence of a high-capacitance coupling is equivalent to a binary ZERO.

The matrix has four data input lines IN–1 through IN–4, plus a noise cancellation input line IN–C. An orthogonal set of output lines OUT–1 through OUT–4 create a matrix of crossover points with the aforesaid input lines. Each of the output lines which are tied to ground through their respective loads, Z, represents a respective one of four possible decoded outputs. The input to be decoded comprises two bits A and B, each of which can take either of two binary values, ONE or ZERO.

Thus there are four possible sets of inputs, as illustrated by the table at the left of FIG. 4. State 1 illustrates the input condition B=O and A=O. State 2 is B=O and A=1. State 3 is B=1 and A=0. State 4 is B=1 and A=1. The position of the little circles indicating high capacitance coupling points in the matrix inherently creates the aforesaid data pattern.

In this circuit a negative-going voltage step such as 100 or 102 is applied to one of the input lines of each bit A and B. Thus, the actual input condition illustrated in FIG. 4 is B=0 and A=1, since the negative voltage step 100 for bit B is applied to the B=0 input line IN–2 while the negative voltage step 102 for the bit A is applied to the A=1 input line IN–3. This input condition requires that the decoded output appear on output line OUT–2 corresponding to the logical condition B=0, A=1.

The first set of wave forms in FIG. 4 indicates the outputs OUT–2 would result from this set of inputs if there is no voltage applied to the noise cancellation input line IN–C. Note that a negative noise spike is coupled to output line OUT–4 by input line IN–3 because the data pattern calls for a high-capacitance coupling at the crossover of those lines. Similarly, a negative noise spike is coupled to output OUT–1 by input line IN–2 because of their high-capacitance coupling. In addition, a much smaller voltage fluctuation is coupled to output line OUT–3 by the stray capacitance which couples that output line that to the two input lines IN–2 and IN–3, despite the fact that there is no high-capacitance coupling at those crossover points.

As a result, the wanted output signal spike appearing on output line OUT–2 is distinguishable from the noise voltages appearing on the other three output lines only by virtue of the fact that it has a greater negative amplitude. This is true because two negative spikes (from input lines IN–2 and IN–3) are both coupled to output line OUT–2 by high-capacitance. crossovers, whereas the other output lines have only one such coupling or none. This means that the worst signal-to-noise ratio is only 2:1, relative to the noise voltage appearing on output lines OUT–1 and OUT–4. (The S:N ratio is somewhat better than that relative to output OUT–3.)

Now, however, if the noise cancellation input line IN–C is strobed at the same time by a positive voltage step 104 equal in amplitude to any one of the two negative inputs 100 and 102, and if the line IN–C is coupled by a high capacitance to each one of the output lines OUT–1 through OUT–4, then a quite different output picture appears. The strobe input substantially cancels the single negative noise voltage step coupled to output lines OUT–4 and OUT–1. But it only half cancels the double amplitude negative voltage on the wanted output line OUT–2. Thus, the worst signal-to-noise ratio is determined by the amplitude of the remaining negative output voltage on the wanted output line OUT–2 compared to the minor negative fluctuations appearing on the unwanted output lines OUT–4 and OUT–1, and is significantly better than 2:1.

The output line OUT–3 which previously had substantially no negative spike coupled thereto, now has a positive spike output appearing thereon, as a result of its capacitive coupling to the noise cancellation input line IN–C. This noise output is substantially equal in amplitude to the wanted output on line OUT–2, but the two can be discriminated on the basis of their opposite polarities by connecting to each of the output lines a detecting circuit which responds only to negative output voltages.

In addition, these detecting devices should have a threshold response level set so as to discriminate against the minor fluctuations appearing on the output lines OUT–4 and OUT–1. The result is that the system is virtually immune to the positive noise or the small negative noise fluctuations appearing on the unwanted output lines, and responds only to the much larger negative spike appearing on the wanted output line.

The specific circuit arrangement of FIG. 4 can be generalized to apply to any number of input bits greater than the two input bits A and B specifically illustrated in FIG. 4. The system illustrated in FIG. 4 requires that the input voltage always be of a particular polarity, the binary value of the input bit depending, not upon the polarity of the input voltage, but upon whether the input is applied to the binary ONE input line or the binary ZERO input line. The noise cancellation input line must be capacitively coupled to all the output lines, to the same extent as the data input lines are coupled to the output lines at high-capacitance crossover points. The noise cancellation strobe must be of opposite polarity to the data input voltage, and must have sufficient amplitude to cancel all but one of the input bits. In other words, if there are $n$ input bits and each input has a voltage amplitude of +V, then the strobe voltage must be minus $(n-1)$V.

Figure 5:
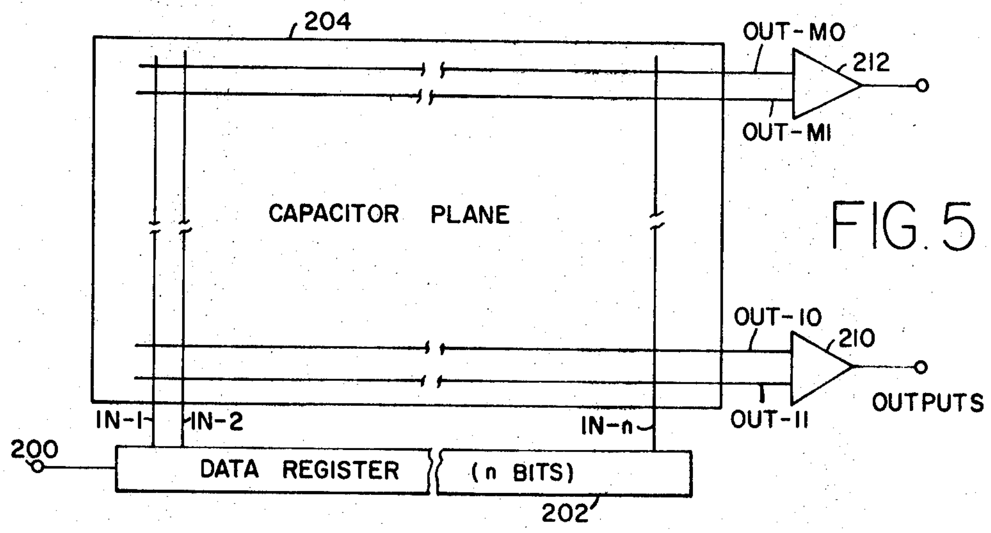
FIGS. 5, 6 and 7 respectively are three additional circuit configurations for enhancing the signal-to-noise ratio of a fixed capacitive memory plane.

FIG. 5 illustrates another bit-parallel input decoding application for a memory plane in accordance with this invention. In this circuit a trigger pulse is applied to an input terminal 200, causing a data register 202 to transmit $n$ bits of data in bit-parallel form over the input lines IN–1, IN–2. IN–$n$ of a capacitor plane 204. There are $m$ decoded outputs, handled by 2 $m$ output lines grouped in $m$ complemental pairs, one such pair for each output. For example, one of the decoded outputs appears on output line OUT–11, while the logical complement of that decoded output appears on its companion line OUT–10. Each pair of complemental output lines such as OUT–11 and OUT–10 or OUT–$m$1 and OUT–$m$0 provides the input to its respective differential amplifier 210 or 212.

It is apparent that any one output line, considered individually, will develop the maximum signal voltage if its capacitance pattern exactly matches every bit in the input data pattern, i.e. if it has a high capacitance at each crossover receiving a ONE bit and low capacitance at each crossover receiving a ZERO bit, whereas every other output line will have a lesser noise voltage resulting from a smaller number of matches.

That fact alone would only produce a signal-to-noise ratio of $V_s/V_n$, where $V_s$=signal voltage and $V_n$=noise voltage. But in this circuit the data register 202 is so constructed that the voltage applied to any one of the input lines IN–1, IN–2, etc. is of one polarity for a binary ONE input, whereas the opposite polarity is applied to the very same input line for a binary ZERO. As a result, the respective output voltages coupled to the particular pair of complemental output lines corresponding to the decoded output are not only the maximum possible for any given data input, but are also equal in amplitude and opposite in polarity. This is true because, for the one pair of output lines having stored capacitance patterns which exactly match and exactly complement the input data respectively, one of those paired output lines will have a high capacitance at each crossover which receives a positive input, and the other will have a high capacitance at each crossover which receives a negative input.

It follows that these equal and opposite voltages on that wanted pair of outputs lines will apply a signal differential of $V_s-(-\alpha^{V_s})=V_s+V_s=2V_s$ to the associated differential amplifier, effectively doubling the signal because of the equal and opposite relationship. In contrast, the voltages on other output lines will not only be smaller individually, but considered from a pair standpoint some of them will cancel each other wholly or partially in the differential amplifier when they happen to be of like polarity. Even when they happen to be of opposite polarities, the differential noise voltage $V_{nl}-(-V_{no})=V_{nl}+V_{no}$ applied to the associated amplifier is still less than the effective signal $2V_s$ because the individual output line signal voltage $V_s$ exceeds $V_{nl}$ and also exceeds $V_{no}$.

Figure 6:
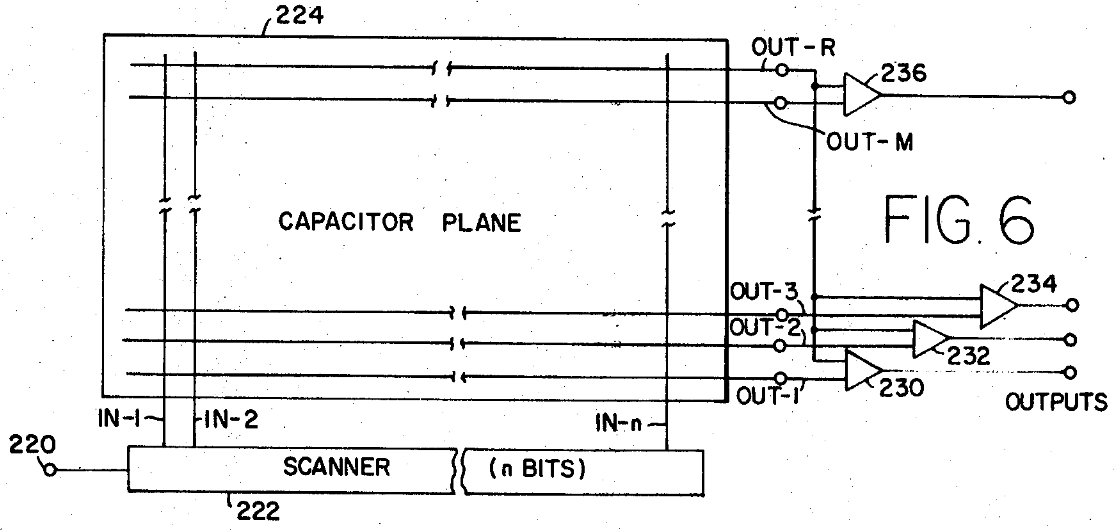

FIG. 6 illustrates a circuit scheme for enhancing the signal-to-noise ratio when the data input is in bit-serial or random form. In this circuit a series of pulses may be applied sequentially to terminal 220 to step a scanner circuit 222 or may be decoded from a set of parallel lines to apply a drive signal to one, and only one, input line. In the embodiment illustrated, with the successive inputs to the terminal 220, the scanner 222 transmits successive binary bits on successive input lines IN–1 through IN–$n$ of a memory plane 224. It should be realized however that the circuit of FIG. 6 would operate as contemplated by the inventive concept whether the inputs on lines IN–1 through IN–$n$ are successive or random. A plurality of orthogonally related output lines OUT–1 through OUT–$m$ is selectively coupled to the input lines according to the appropriate data pattern. In addition, there is a reference output line OUT–R which has a low capacitance crossover with each one of the input lines IN–1 through IN–$n$.

Each individual output line OUT–1 through OUT–$m$ is connected to one of the input terminals of respective differential amplifiers 230 through 236. In addition, the remaining input terminal of each of the differential amplifiers is connected to the reference output line OUT–R.

The reference output line, since it has a noise level capacitance coupling to each of the input lines, has a noise voltage coupled thereto for each input on any of the serially driven input lines IN–1 through IN–$n$. Any data output line OUT–1 through OUT–*m* however may have either a noise output voltage or a signal output voltage thereon, depending upon whether a binary ONE or a binary ZERO appears on that output line at any given time. If a particular output line produces a binary ONE output, then the resulting output voltage form the associated differential amplifier 230 through 236 would be A(E1–E0), where A is the amplification factor of the differential amplifier, E1 is the signal output voltage appearing on one of the output lines OUT–1 through OUT–*m* for a binary ONE output, and E0 is the smaller noise output voltage when a binary ZERO output appears on one of those lines. In other words, the output of the differential amplifier is the amplification factor times the differential between the signal and noise voltages.

Since the differential between the signal and noise voltages is substantial, the amplified signal output voltage is also substantial. But when only a noise voltage is coupled to any one of the output lines, then the output produced by any one of the differential amplifiers is A(E0–E0)=A(0)=0. In words, when the differential between a noise output voltage on one of the data output lines OUT–1 through OUT–*m* and the noise output voltage which always appears on the reference output line OUT–*r* is substantially zero, then the output of the associated differential amplifier 230 through 236 is also substantially zero. It follows that the effective signal-to-noise ratio is theoretically infinite, or at least for all practical purposes is greatly enhanced.

Figure 7:
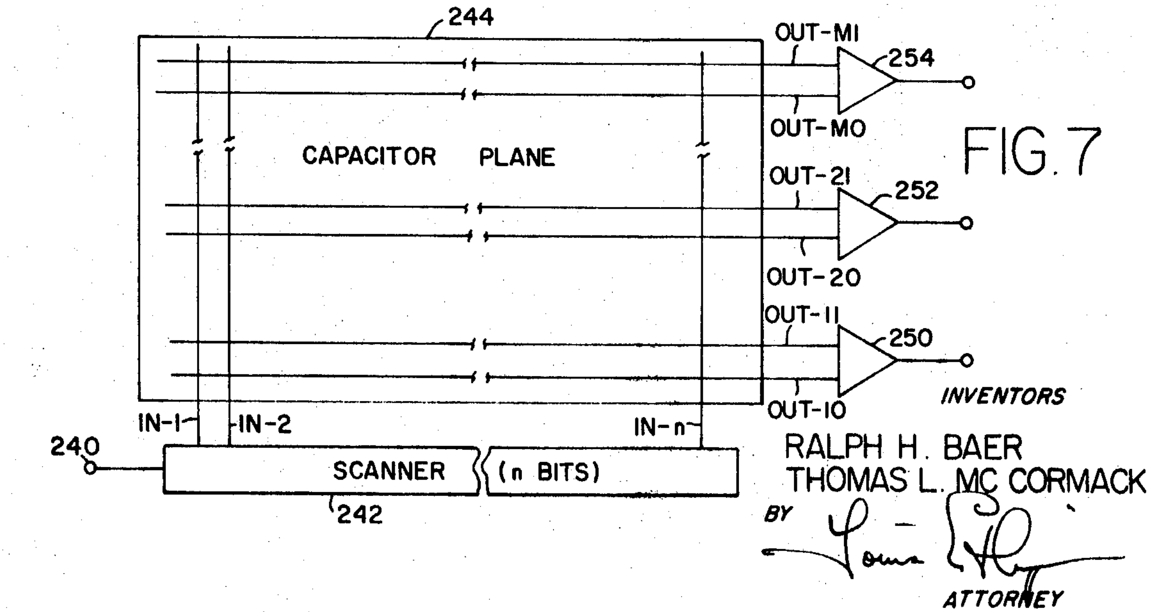

Still another signal-to-noise enhancement scheme for use with a bit serial ro random input as discussed in relation to FIG. 6 is illustrated in FIG. 7. As illustrated, a sequence of pulses is applied to terminal 240 to drive a scanner 242 which in this embodiment applied bit-serial data inputs to the input line IN–1 through IN–*n* of a capacitor plane 244. The orthogonally related output lines are organized in complemental pairs OUT–10 and OUT–11 through OUT–*m*0 and OUT–*ml*, just as in the circuit of FIG. 5. One of the decoded outputs appears on output line OUT–10, while the complement of that decoded output appears on its paired output line OUT–11, and similarly for all other pairs of output lines. Differential amplifiers 250 through 254 are provided for the respective pairs of output lines OUT–10, OUT–11, through OUT–*m*0, OUT–*ml*.

Since the paired lines are complemental, one of those lines will have an output voltage E1 corresponding to a signal output representing a binary ONE, and the other line will have a smaller noise output E0 corresponding to a binary ZERO. Thus, the output of the differential amplifier will always be the amplification factor times the difference between the signal and noise voltage levels. However, when a binary ONE appears on the output line OUT–10, OUT–20, or OUT–*m*0 and the noise voltage or binary ZERO appears on the output line OUT–11, OUT–21, or OUT–*ml*, then the differential amplifier will be of one polarity, while the output will be of the opposite polarity under the opposite conditions, i.e., when the binary ONE signal voltage appears on the output line OUT–11, OUT–21, or OUT–*ml* and the binary ZERO noise voltage appears on the output line OUT–10, OUT–20, or OUT–*m*0. Thus, the polarity of the differential amplifier output is strictly correlated with the decoded data output, one polarity for a binary ONE and the opposite polarity for a binary ZERO output. Then all that is necessary to discriminate between these two outputs is to apply the output of the differential amplifiers to circuits which respond only to a given polarity, and preferably having a threshold response level which would discriminate against minor fluctuations of the desired polarity.

It will now be appreciated that these circuit approaches, particularly when used in conjunction with the memory plane of this invention which already has high signal-to-noise ratio, will give extremely high effective signal-to-noise ratios for the systems, effectively overcoming what has in the past been the principal difficulty in using fixed capacitive memory planes. The order of magnitude of the improvement effected by this invention may be readily appreciated when it is realized that, apart from any enhancement of the signal-to-noise ratio contributed by the circuits of FIGS. 4 through 7, the signal-capacitance to noise-capacitance ratio for the memory plane itself is of the order of 90:1. This is a great increase over the capacitance ratio achieved by prior art capacitive memory planes in which each pair of capacitor plates has the same spacing as each pair of input and output lines without capacitor plates. In addition, the capacitor plane of this invention may be produced by a series of well-understood printed circuit steps, resulting in a device which has a monolithic structure far more rugged mechanically and reliable electrically than any previous three-dimensionally structured capacitive memory plane.

The invention claimed is:

1. A three-dimensionally structured, high signal-to-noise ratio, capacitive pattern storage device, said device comprising:

A. an assembly of dielectric material comprised of a plurality of layers, said assembly having a thickness dimension extending through a plurality of levels;
B. a first set of conductors embedded in said dielectric material at a first level thereof and arranged to define one address coordinate of a matrix;
C. a second set of conductors embedded in said dielectric material at a second level thereof, spaced from said first level, and arranged in crossing relationship to said first set of conductors to define another address coordinate of said matrix;
D. at least one conductor in said first set and at least one conductor in said second set having first and second pillars, respectively, extending toward one and another at the point where said one conductors cross one another;
E. first and second planar capacitor plates mounted integrally on said first and second pillars, respectively, so as to be spaced from and facing one another and so as to be parallel to said conductor set levels;
F. The spacing between said conductor levels establishing a noise capacitance level between crossing conductors of said two sets at an address having no capacitor plates; and
G. the spacing between said capacitor plates and its opposing capacitor plate being substantially smaller than said spacing between conductor levels whereby to increase said signal-to-noise ratio.

2. A device as in claim 1 wherein one of said opposing capacitor plates is greater in planar area than the other of said plates.

3. A device as in claim 2 wherein said opposing capacitor plates are molecularly united with and larger in planar area than the cross sectional area of said pillars.

4. A device as in claim 3 wherein said dielectric material in that layer of said plurality of layers between said pair of opposing capacitor plates has a different dielectric constant than said dielectric material in the others of said plurality of layers.

5. A device as in claim 3 wherein said three-dimensionally structured device is monolithic in structure.

6. A device as in claim 2 wherein:

A. said dielectric material surrounds said sets of conductors on the sides thereof opposite said capacitor plates; and
B. a pair of isolating conductors are secured to said dielectric material on either side thereof, and spaced by said dielectric material from said sets of conductors.